United States Patent [19]

Drori

[11] Patent Number: 4,863,598

[45] Date of Patent: * Sep. 5, 1989

[54] MULTIPLE DISC TYPE FILTERS

[76] Inventor: Mordeki Drori, P.O. Box 21538, Tel Aviv, Israel

[ * ] Notice: The portion of the term of this patent subsequent to Feb. 10, 2004 has been disclaimed.

[21] Appl. No.: 72,648

[22] Filed: Jul. 13, 1987

[51] Int. Cl.$^4$ .................. B01D 29/38; B01D 29/46
[52] U.S. Cl. .................. 210/232; 210/332; 210/346; 210/350; 210/357; 210/488
[58] Field of Search .............. 210/232, 345, 347, 485, 210/488, 314, 346, 350, 357, 407, 444, 236–238, 323.1, 332, 333.01, 344; 55/475, 484

[56] References Cited

U.S. PATENT DOCUMENTS

| | | | |
|---|---|---|---|
| 730,485 | 6/1903 | Simoneton | 210/488 |
| 1,581,998 | 4/1926 | Fulcher . | |
| 1,642,864 | 9/1927 | Williams | 210/488 |
| 1,673,743 | 6/1928 | Fulcher et al. | 210/415 |
| 1,719,346 | 7/1929 | Thompson | 210/357 |
| 1,797,399 | 3/1931 | Boulade . | |
| 1,849,042 | 3/1932 | Pickard et al. . | |
| 1,852,873 | 4/1932 | Berger . | |
| 1,906,391 | 5/1933 | McKinley | 210/413 |
| 1,926,557 | 9/1933 | Perkins | 210/167 |
| 1,929,246 | 10/1933 | Hechenbleikner | 55/484 |
| 1,976,547 | 10/1934 | Dumas | 210/169 |
| 2,330,945 | 10/1943 | Becker | 210/169 |
| 2,365,525 | 12/1944 | Cox | 210/415 |
| 2,374,756 | 5/1945 | Kisch et al. | 210/170 |
| 2,495,095 | 1/1950 | Ewbank | 210/169 |
| 2,519,506 | 8/1950 | Russell | 210/183 |
| 2,575,995 | 11/1951 | Briggs et al. | 210/492 |
| 2,583,423 | 1/1952 | Halinan | 210/185 |
| 2,670,851 | 3/1954 | Curtis | 210/120 |
| 2,692,686 | 10/1954 | Fleck | 210/488 |
| 2,702,637 | 2/1955 | Shepard | 210/492 |
| 2,757,802 | 8/1956 | Schmid | 210/169 |
| 2,855,106 | 10/1958 | English | 210/192 |
| 2,873,030 | 2/1959 | Ashton | 210/488 |
| 3,105,042 | 9/1963 | Roosa | 210/94 |
| 3,195,730 | 7/1965 | Muller | 210/488 |
| 3,382,982 | 5/1968 | Stevens | 210/184 |

(List continued on next page.)

FOREIGN PATENT DOCUMENTS

| | | |
|---|---|---|
| 126722 | 2/1948 | Australia . |
| 156599 | 5/1954 | Australia . |
| 549633 | 12/1957 | Canada . |
| 586111 | 11/1959 | Canada . |
| 846245 | 7/1949 | Fed. Rep. of Germany . |
| 1007743 | 5/1957 | Fed. Rep. of Germany . |
| 1289827 | 2/1969 | Fed. Rep. of Germany . |
| 2453445 | 5/1976 | Fed. Rep. of Germany . |
| 899337 | 5/1945 | France . |
| 473331 | 7/1952 | Italy . |
| 44-2936 | 2/1969 | Japan . |
| 10814 | of 1885 | United Kingdom ............... 210/488 |
| 300600 | 11/1928 | United Kingdom . |
| 570960 | 7/1945 | United Kingdom . |
| 687967 | 2/1953 | United Kingdom . |
| 841207 | 7/1960 | United Kingdom . |
| 926600 | 5/1963 | United Kingdom . |
| 1096739 | 12/1967 | United Kingdom . |

OTHER PUBLICATIONS

Spielman, Lloyd A., "Particle Capture From Low-Speed Laminar Flows" Am. Rev. Fluid Mech 1977, 9:297–319, 1977.

Primary Examiner—Richard V. Fisher
Assistant Examiner—Linda S. Evans
Attorney, Agent, or Firm—Pearne, Gordon, McCoy & Granger

[57] ABSTRACT

A multiple-disk type filter including a stack of filter disks disposed in a housing and an extensible support for external placement relative to the stack of filter disks, the extensible support including first and second base elements located externally of the stack and a multiplicity of externally located rod members joining the first and second base elements in sliding relationship, a first plurality of the rod members being fixedly attached to the first base element and being arranged for slidable supporting engagement with the second base element and a second plurality of the rod members being fixedly attached to the second base element and being arranged for slidable supporting engagement with the first base element, the rod members being disposed externally relative to the stack of filter disks.

2 Claims, 2 Drawing Sheets

U.S. PATENT DOCUMENTS

| | | | |
|---|---|---|---|
| 3,529,726 | 9/1970 | Keenan | 210/232 |
| 3,561,602 | 2/1971 | Molitor | 210/266 |
| 3,622,003 | 11/1971 | Czech et al. | 210/108 |
| 3,647,084 | 3/1972 | Martin | 210/492 |
| 3,648,843 | 3/1972 | Pearson | 210/443 |
| 3,789,990 | 2/1975 | Drori | 210/310 |
| 4,045,345 | 8/1977 | Drori | 210/107 |
| 4,062,774 | 12/1977 | Hinojosa | 210/94 |
| 4,067,812 | 0/0000 | Drori | |
| 4,251,374 | 2/1981 | Cunningham | 210/232 |
| 4,267,042 | 5/1981 | Hofmann | 210/169 |
| 4,297,209 | 10/1981 | De Visser et al. | 210/107 |
| 4,402,829 | 9/1983 | Cordua | 210/333.01 |
| 4,410,430 | 10/1983 | Halger, Jr. | 210/446 |
| 4,430,232 | 2/1984 | Doucet | 210/798 |
| 4,435,287 | 3/1984 | Sumimoto | 210/131 |
| 4,468,319 | 8/1984 | Laakso | 210/97 |
| 4,481,111 | 11/1984 | Christophe et al. | 210/333.01 |
| 4,552,655 | 11/1985 | Granot | 210/108 |
| 4,552,662 | 11/1985 | Webster et al. | 210/232 |
| 4,572,784 | 2/1986 | Drori | 210/133 |
| 4,624,785 | 11/1986 | Drori | 210/414 |
| 4,642,182 | 2/1987 | Drori | 210/232 |
| 4,654,143 | 3/1987 | Drori | 210/232 |
| 4,655,910 | 4/1987 | Tabor | 210/107 |
| 4,655,911 | 4/1987 | Tabor | 210/107 |
| 4,683,060 | 7/1987 | Drori | 210/448 |
| 4,707,258 | 11/1987 | Drori | 210/333.1 |
| 4,744,901 | 5/1988 | Drori | 210/323.1 |

MULTIPLE DISC TYPE FILTERS

FIELD OF THE INVENTION

The present invention relates to filters and particularly to multiple-disc type filters useful in filtering particles from water and in many other applications.

BACKGROUND OF THE INVENTION

Multiple-disc type filters generally include a housing in which the filter body within the housing is in the form of a stack of like, centrally-apertured, filter discs having grooved side faces defining filtering channels between the adjacent discs in the stack. In some applications of such filters, the outer face of the stack of filter discs constitutes the upstream side of the filter, in which case the fluid being filtered passes from the outer face to the inner face of the stack. In other applications of such filters, the inner face of the stack constitutes the upstream side of the filter, in which case the fluid being filtered passes from the inner to the outer face through the filter stack.

A multiple-disk type filter into which there is incorporated extensible support apparatus is disclosed in the applicant's U.S. Pat. No. 4,642,182 issued Feb. 10, 1987. The filter includes a stack of filter disks in a housing and an extensible support for the stack of filter disks disposed internally thereof, the extensible support including first and second base elements and a multiplicity of rod members joining the first and second base elements in sliding relationship, a first plurality of the rod members being fixedly attached to the first base element and being arranged for slidable supporting engagement with the second base element and a second plurality of the rod members being fixedly attached to the second base element and being arranged for slidable supporting engagement with the first base element.

In view of the internal disposition of the extensible support relative to the stack of filter disks, however, the support does not facilitate the introduction of a cleaning nozzle, or other similar cleaning apparatus, internally of the stack without first disassembling it. It is particularly important to be able to introduce cleaning apparatus internally of the stack, especially where the inner face of the stack is also the downstream face.

SUMMARY OF THE INVENTION

The present invention relates to a novel form of extensible support for the stack of disks in a multiple-disk type filter which overcomes the disadvantages of the prior art.

There is thus provided in accordance with an embodiment of the present invention, a multiple-disc type filter comprising a stack of filter disks disposed in a housing and an extensible support for external placement relative to the stack of filter disks, the extensible support including first and second externally located base elements and a multiplicity of externally located rod members joining the first and second base elements in sliding relationship, a first plurality of the rod members being fixedly attached to the first base element and being arranged for slidable supporting engagement with the second base element and a second plurality of the rod members being fixedly attached to the second base element and being arranged for slidable supporting engagement with the first base element.

According to a preferred embodiment of the invention, the base elements comprise first and second annuli disposed generally in parallel planes, each annulus being pierced perpendicularly to the planes by a number of corresponding holes such that a rod attached by one end to a hole in one annulus may slide through the corresponding hole in the other annulus, a plurality of rods in respect of each rod of which one end is fixedly engaged in alternate holes in said first annulus and the other end is slidingly engaged with the corresponding hole in said second annulus, and a plurality of rods in respect of each rod of which one end is fixedly engaged in alternate holes in said second annulus and the other end is slidingly engaged with the corresponding hole in said first annulus, such that the annuli may be moved either closer together or farther apart by means of the sliding engagement of each rod attached to one annulus and passing through a corresponding hole in the other annulus.

Each annulus preferably contains originally an even number of holes, so that each such hole either has one of the rods fixedly inserted therein or is free to slidingly engage a rod fixedly inserted into a corresponding hole in the other annulus. It is preferable for the holes to be evenly spaced from each other.

It will be appreciated that if each annulus contains six holes, then three rods will pass slidingly through alternate holes, and presuming that the holes are equidistant, and that the annuli are relatively close together, then the stack of filter disks will be supported symmetrically by three rods for all of its length, with the exception of the relatively short distance separating the annuli. In similar circumstances, but with eight holes, the stack of filter discs will be supported symmetrically by four rods for most of its length.

It is evident that because the stack of discs will be supported for the greater part of its length by a relatively small number of rods, the access of the fluid to the inner surface of the stack - regardless of whether this is upstream or downstream - is generally without interference.

Moreover, due to the external location of the support relative to the stack, cleaning thereof may be carried out by introducing appropriate apparatus, such as a cleaning nozzle, into the central cavity of the stack.

Additionally in accordance with a preferred embodiment of the invention, there are provided first and second end elements, said first end element being fixedly attached to a plurality of rods which are fixedly attached at their opposite end to said first base element, and said second end element being fixedly attached to a plurality of rods which are fixedly attached at their opposite ends to said second base element.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
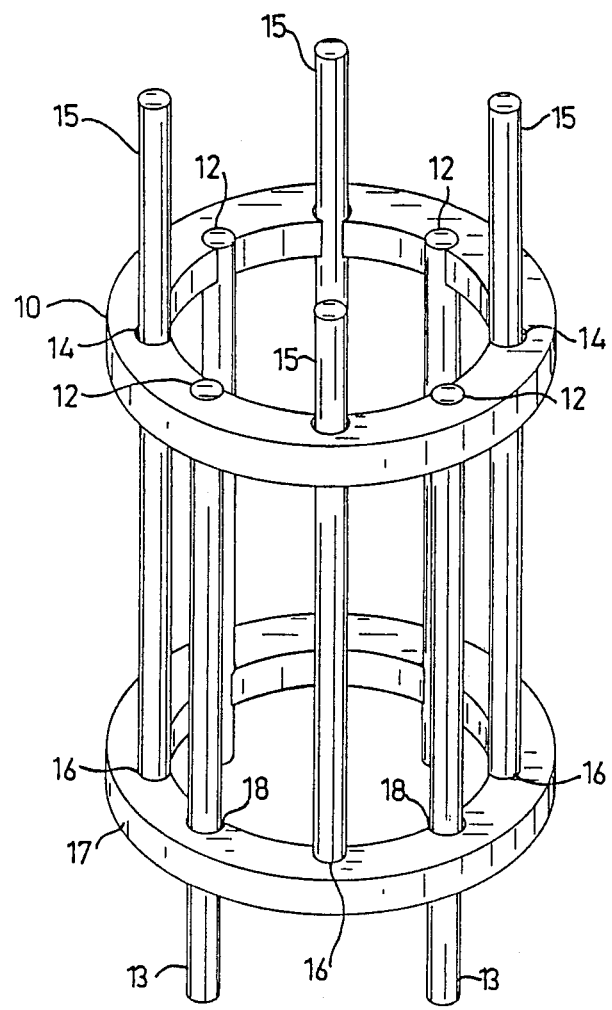
FIG. 1 is a perspective veiw of the stack support of the invention.

Reference is now made to FIG. 1, which is a simple pictorial representation of the external filter stack support of the invention. A first base element in the form of an annulus 10 has four holes 12 in which are fixedly inserted rods 13, and four holes 14 in which are slidingly engaged rods 15, which in turn are fixedly inserted into holes 16 in a second base element in the form of an annulus 17. Annulus 17 also contains four holes 18 in which are slidingly engaged rods 13. It is appreciated that any suitable number of rods may be employed and that the number of rods 13 need not be equal to the number of rods 15.

Figure 2:
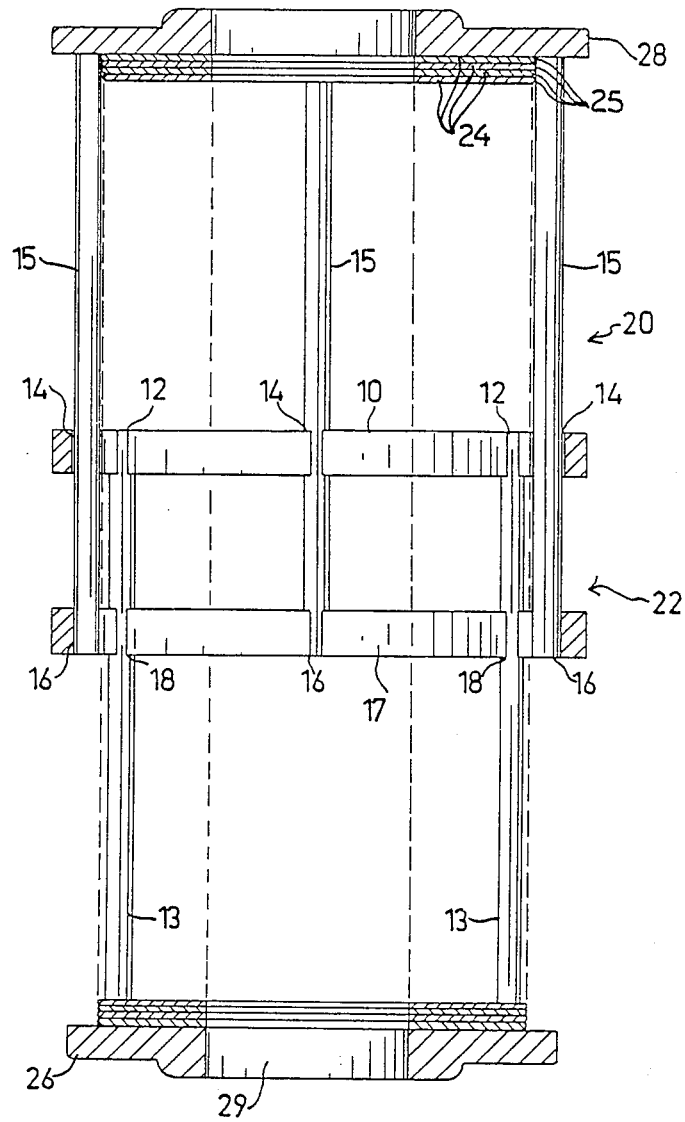
FIG. 2 is a partially cut away side view illustration of a filtration unit employing the stack support of FIG. 1.

FIG. 2 shows a filtration unit 20, employing an external stack support 22, generally of the type described in connection with FIG. 1. A stack of annular filter disks 24 is supported on stack support 22, outer edges 25 of filter disks 24 being surrounded and engaged by respective rods 13 and 15, thus maintaining alignment of disks 24 in the entire stack. First and second end elements 26 and 28 are rigidly attached to the free ends of respective rods 13 and 15 for retaining the filter disks on the support 22.

In operation, fluid enters through aperture 29 and exits through the side of the stack of filter discs, or alternatively fluid enters through the side and exits through aperture 29. It is noted that by pulling end elements 26 and 28 apart, the base elements 10 and 17 are brought closer together and the axial distance available to the stack of disc elements is increased, so that the individual disks 24 can be separated for rinsing and flushing accumulated particulate matter therefrom, without requiring their removal from the support 22.

It is a particular feature of the present invention that the external disposition of stack support 22 relative to the stack of disks 24 permits access of cleaning or backflushing apparatus to the central cavity of the stack as well as to the exterior thereof. This contrasts with the applicant's U.S. Pat. No. 4,642,182 issued Feb. 10, 1987 in which there is disclosed an extensible stack support designed for placement within the central cavity of a stack of disks, which inhibits access of cleaning apparatus into the central cavity thereof.

A preferred embodiment of a filter disk is described in U.S. patent application Ser. No. 647,093, filed Sept. 4, 1984, of the present inventor, the relevant disclosure of which is incorporated herein by reference.

It will be appreciated by persons skilled in the art that the present invention is not limited to what has been particularly shown and described hereinabove. The scope of the present invention is defined, rather, solely by the claims which follow:

I claim:

1. A multiple-disc type filter comprising:
   a stack of filter disks; and
   an extensible support for said stack of filter disks disposed externally thereof, and including first and second base elements, first and second end elements and a multiplicity of rod members joining the first and second base elements in sliding relationship, a first plurality of the rod members being fixedly attached to the first base element and being arranged for slidable supporting engagement with the second base element and a second plurality of rod members being fixedly attached to the second base element and being arranged for slidable supporting engagement with the first base element,
   said first end member being attached to said first plurality of rod members;
   said second end member being attached to said second plurality of rod members;
   said first and second base elements defining exterior base elements and being located exteriorly of said stack of filter disks at an intermediate location therealong;
   at least one of said base elements defining means for providing a fluid path to and from the interior of said stack;
   said first and second end elements defining exterior base elements and being located exteriorly of said stack; and
   said first and second pluralities of rod members being located exteriorly of said stack.

2. A filter according to claim 1 and wherein said first and second base elements comprise first and second annuli disposed generally in parallel planes, each annulus being pierced perpendicularly to said planes by a number of corresponding holes such that a rod member attached by one end to a hole in one annulus may slide through the corresponding hole in the other annulus, one end of each of said first plurality of rod members being fixedly engaged in alternate holes in said first annulus and slidingly engaged with the corresponding hole in said second annulus, and one end of each of said second plurality of rod members being fixedly engaged in alternate holes in said second annulus and slidingly engaged with the corresponding hole in said first annulus, such that the annuli may be moved either closer together or farther apart by means of the sliding engagement of each rod attached to one annulus and passing through a corresponding hole in the other annulus.

* * * * *